4 Sheets—Sheet 1.

C. F. ATWOOD.

Assignor, by mesne assignments to J. F WILEY, V. C. PRICE and T. F. KEATIN

Time-Lock.

No. 7,966. Reissued Nov. 27, 1877.

WITNESSES

Wm A Skinkle

Geo W Breck

By his Attorney

INVENTOR

Corydon F. Atwood

John F. Paret

4 Sheets—Sheet 2.

C. F. ATWOOD.

Assignor, by mesne assignments to J. F. WILEY, V. C. PRICE and T. F. KEATING

Time-Lock.

No. 7,966. Reissued Nov. 27, 1877.

WITNESSES

Geo. W. Brinkle

Geo. H. Buck

By his Attorney

Corydon F. Atwood.

John P. Pard

C. F. ATWOOD.

Assignor, by mesne assignments to J. F. WILEY, V. C. PRICE and T. F. KEATING

Time-Lock.

No. 7,966. Reissued Nov. 27, 1877.

WITNESSES

Wm A Skinkle

Geo W Breck

INVENTOR

Corydon F. Atwood.

By his Attorney

John F. Dare

C. F. ATWOOD.

Assignor, by mesne assignments to J. F WILEY, V. C. PRICE and T. F. KEATING.

Time-Lock.

No. 7,966. Reissued Nov. 27, 1877.

WITNESSES

Wm A Skinkle

Geo. H. Brock

By his Attorney

INVENTOR

Corydon F. Atwood

John F. Poret

UNITED STATES PATENT OFFICE.

CORYDON F. ATWOOD, OF HANCOCK, WISCONSIN, ASSIGNOR, BY MESNE ASSIGNMENTS, TO JAMES F. WILEY, VINCENT C. PRICE, AND THOMAS F. KEATING.

IMPROVEMENT IN TIME-LOCKS.

Specification forming part of Letters Patent No. 105,291, dated July 12, 1870; Reissue No. 7,966, dated November 27, 1877; application filed October 3, 1877.

*To all whom it may concern:*

Be it known that I, CORYDON F. ATWOOD, of Hancock, in the county of Waushara and State of Wisconsin, have invented a new and Improved Time-Lock, of which the following is a specification that will enable others skilled in the art to make and use the same, reference being had to the accompanying drawings.

The object of my invention is to produce a time-lock for safes and vaults to secure and automatically release and operate their bolts; and my invention consists, essentially, in the setting and locking or unlocking devices, hereinafter described in detail, and then definitely set forth in my claims.

Figure 1:
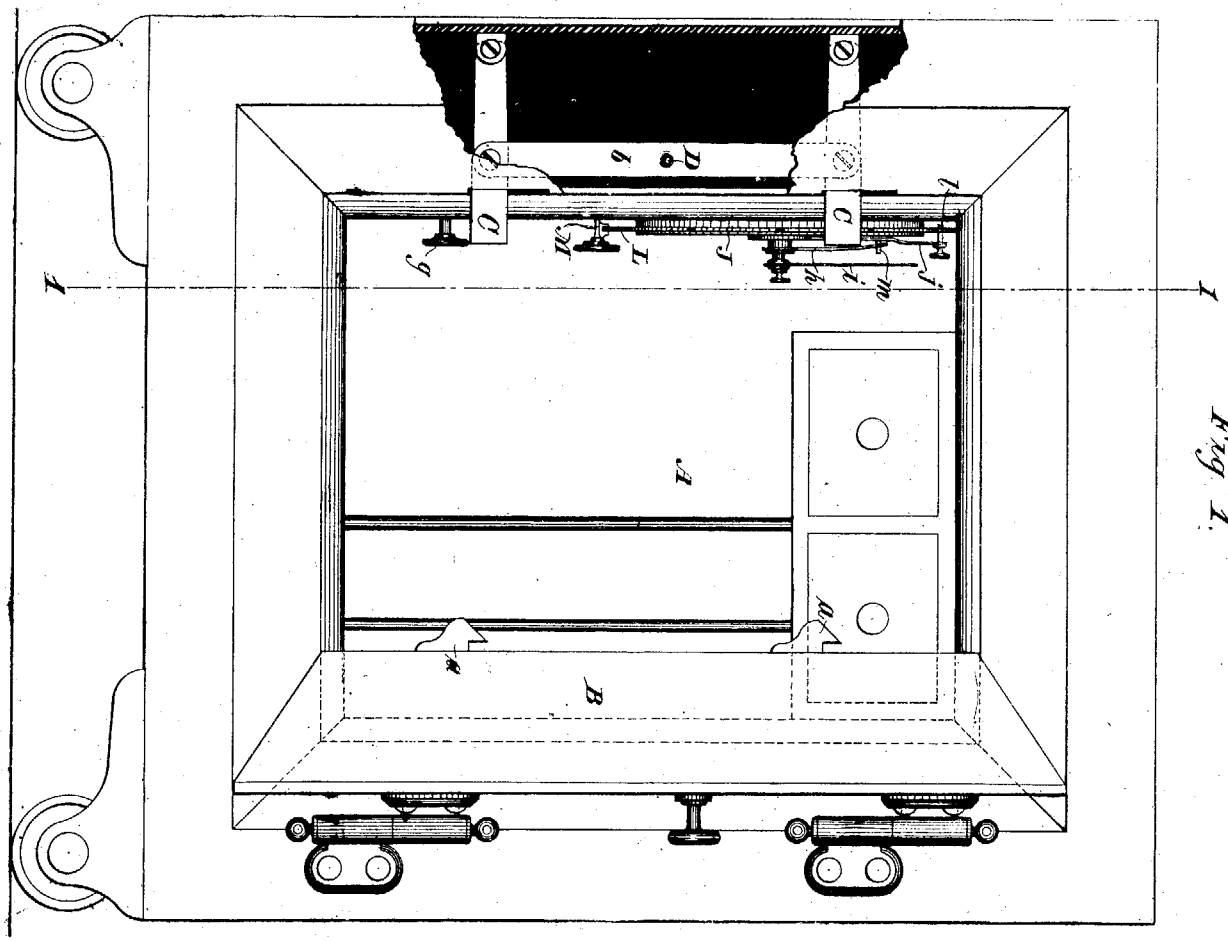
Figure 2:
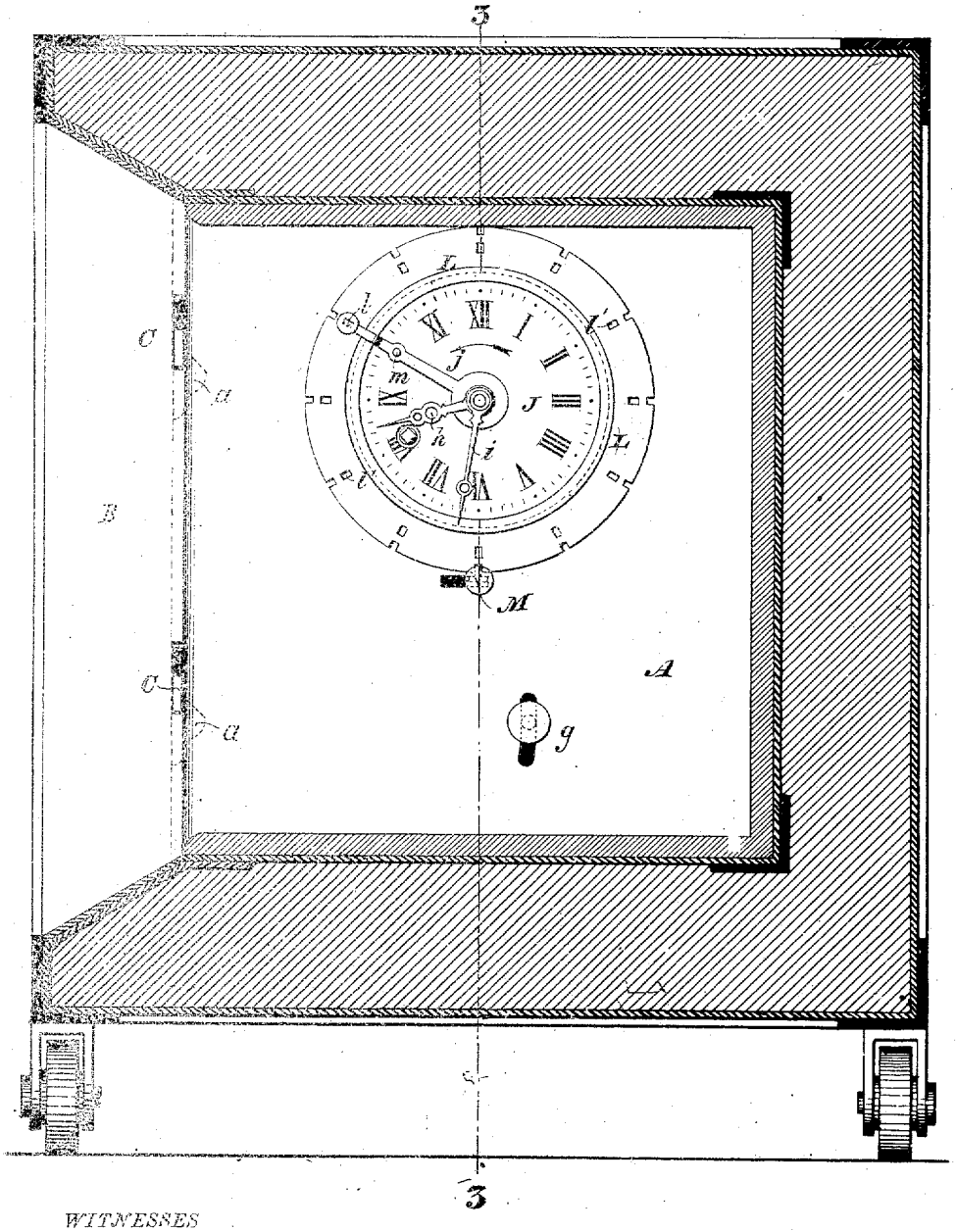
Figure 3:
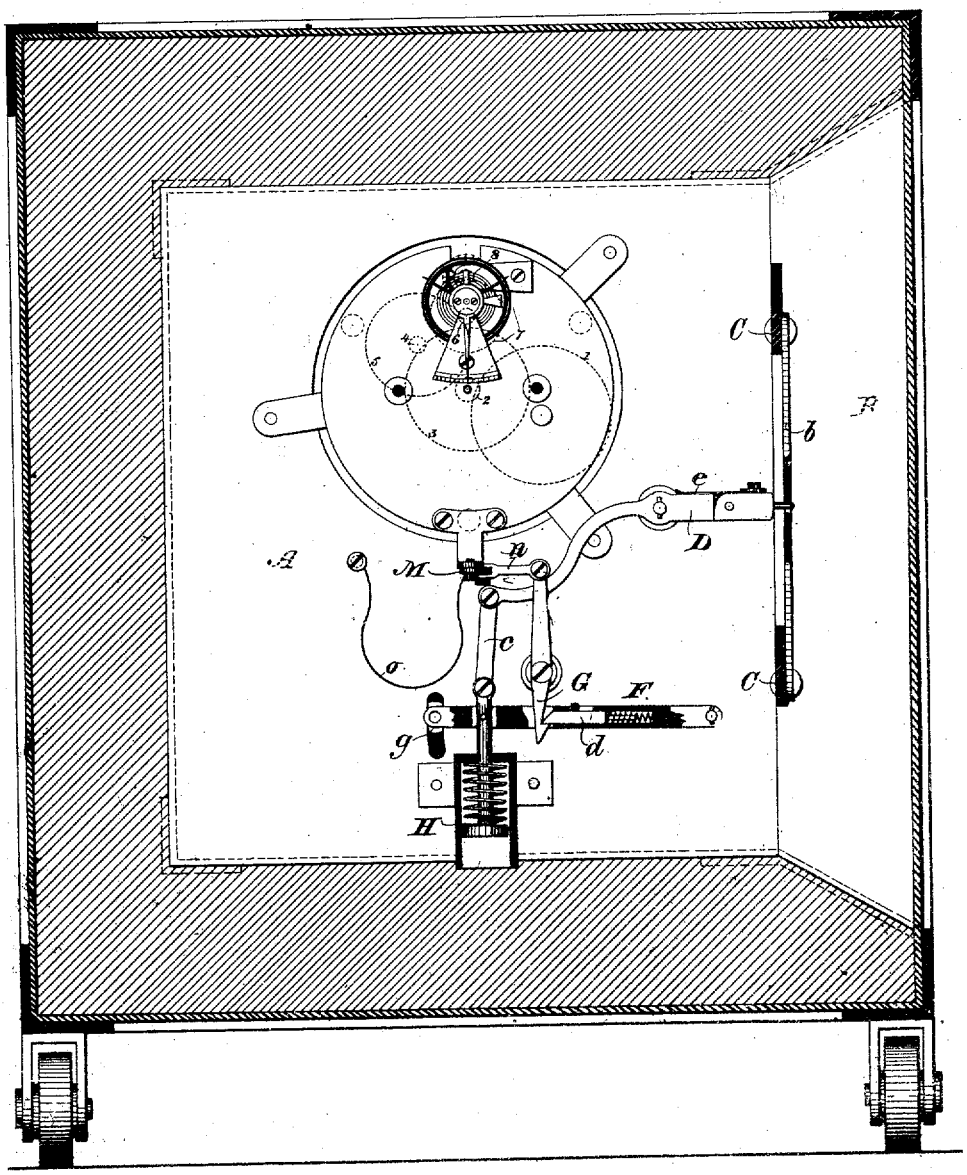
Figure 4:
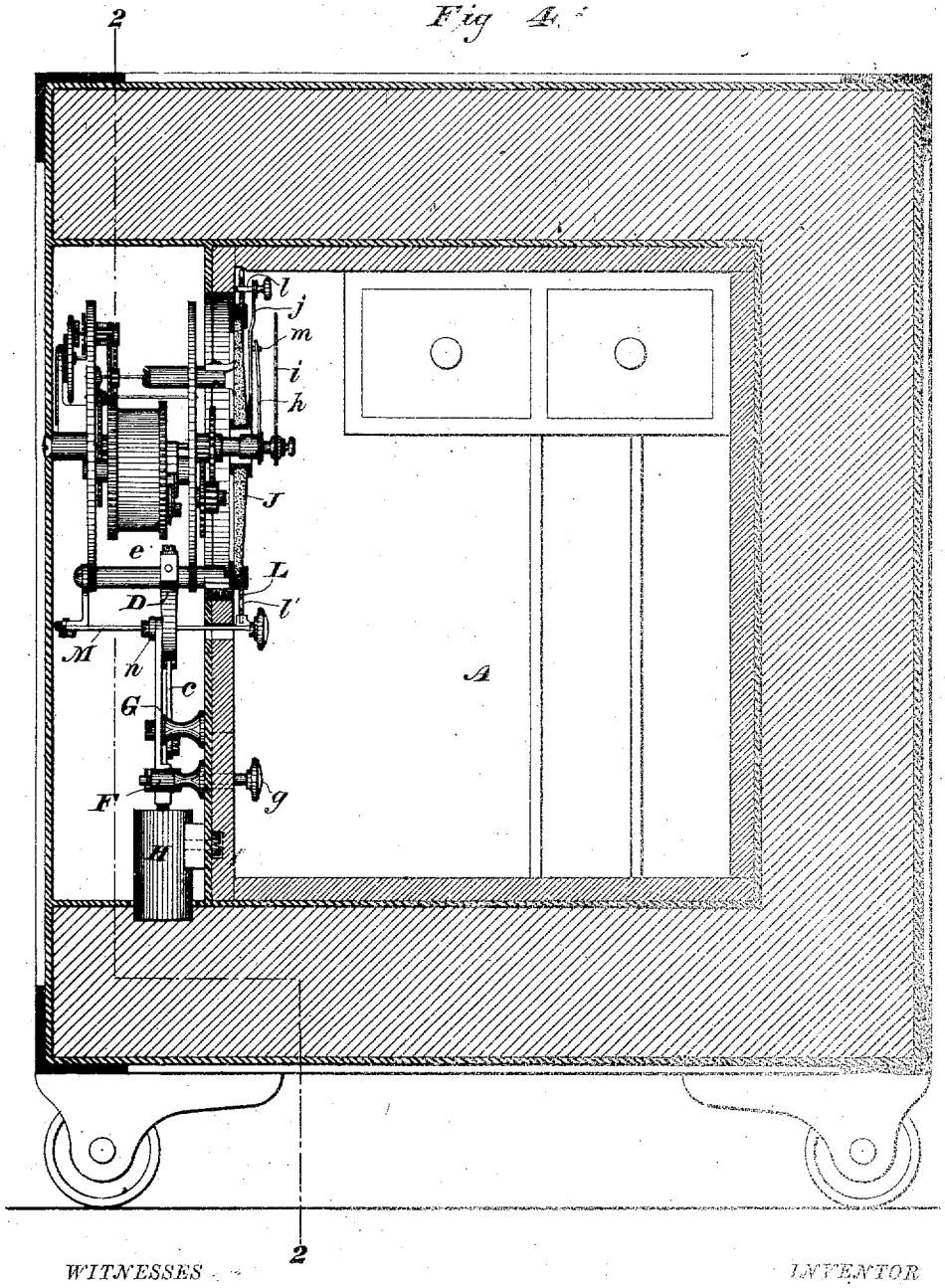

In the accompanying drawings, forming part of this specification, Figure 1 represents a front elevation of a safe provided with my improved lock, with the door thrown open and part of the casing of the safe broken away to show more clearly the bolts and their connections. Fig. 2 is a vertical longitudinal section of the same on the line 1 1 of Fig. 1. Fig. 3 is a similar section on the line 2 2 of Fig. 4, and Fig. 4 is a vertical transverse section on the line Z Z of Fig. 2.

A indicates a safe or vault, and B the door of the same. On the inner face of the door are formed hooks or equivalent catches, *a a*, into which the bolts C C are to be locked. These bolts, as I have illustrated them, are pivoted to the side of the safe and connected with each other by a rod, *b*, so that they will move simultaneously for locking or unlocking. The lock proper is connected with the rod *b* by means of a jointed lever, D, which is, by means of a link, *c*, connected with a pivoted lifting or setting arm or lever, F. This setting-arm contains a spring-catch, *d*, to aid in connecting it with the pivoted hook or catch G. I provide a contracting-spring, *o*, the ends of which always tend to approach each other, connected by means of a link with the upper end of the hook or catch G, which spring is sufficient to cause the engagement of the hook or catch and setting-arm, and to hold them in engagement until released for unlocking by the operation of the time mechanism, in case of the failure of the spring of the hook or catch *d*.

At the joint in the lever D, I provide a spring, *e*, which tends to keep the jointed parts of the lever in alignment, but which will allow the outer part to swing up when the hook G and setting-arm F are in engagement, and thus permit the bolts C C to ride over the catches *a a*, when the spring *e* will force them down behind said catches and effect locking.

I provide a knob, *g*, on the free end of the setting-arm F, by means of which to swing the arm up by hand, to be caught and held by the hook or catch G when setting the lock in the locked position.

The time mechanism, when wound, can be set, in the manner particularly described below, to oscillate the hook G at any desired time, and thereby release the arm F, which is provided with a spring, H, that always tends to swing down its free end and effect unlocking.

The time mechanism operates two hands, *h i*, over the face of the dial J, as in an ordinary clock. Around the dial-arbor, and concentrically therewith, I place an annular disk, L, provided on its perimeter with teeth or projections, and adapted to be rotated at the proper time in conjunction with the arbor by the time mechanism.

Upon the dial-arbor is loosely fitted a third hand, *j*, which is made of spring metal, and carries a pin, *l*, that can readily be placed into one of the holes *l'* of the wheel L. Another pin, *m*, on the third hand *j* projects into the path of the hour-hand *h*, and when that hand strikes the pin *m* it will carry the hand *j* and the annular disk L around with it to effect unlocking, as presently explained.

The upper end of the hook G is connected by a link, *n*, with a horizontal lever, M, acted on by the contracting-spring *o*, and resting normally in one of the spaces between and in the path of the teeth or projections of the annular disk L.

The operation of my mechanism thus constructed is as follows: Supposing the lock to be in the unlocked position, the setting-arm F and the hook G will be disengaged, and there will be no operative connection between the time mechanism and the immediate door-fastening appliances. The free end of the arm F will be held down by the spring H, and the lever D, on account of its connection with the arm F by link *c*, will be turned on its pivot, so as to elevate the rod *b* and bolts C C into the unlocked position.

In this condition of the mechanism the door, if closed, can be freely swung open, in which position it must always be when the lock is to be set into the locked position. Supposing the door to be open, and that it is desired to effect its locking, and that the time mechanism is properly wound and running to correct time, the third hand *j* should then be set and engaged by its pin *l* with the annular disk L, opposite that mark on the dial indicating the time at which it is desired to have the safe automatically unlocked—for instance, at ten o'clock a. m. on the following day. This accomplished, the lever M, if not already there through the operation of the spring *o*, should be placed in one of the spaces between the projections of the annular disk L, and the setting-arm F should be raised by means of its knob *g*, so as to be caught and held up by the hook G. The raising and securing of the arm F will elevate and secure the inner end of the lever D, and at the same time depress the rod *b* and bolts C C, when the lock will be duly set in the locked position, and the door ready to be closed and automatically locked by the bolts riding over and being forced behind the catches *a a* through the operation of the joint and spring *e* of the lever D.

The unlocking will afterward be automatically accomplished as follows: When the hour-hand arrives at the mark on the dial indicating the time for unlocking, it will engage with the pin *m* and move the third hand *j* and rotate the annular disk L. As the annular disk turns, one of its projections impinges against the lever M and oscillates the hook G, to release or let go the setting-arm F. The spring H then instantly draws down the free end of the setting-arm, and causes the raising of the bolts through the instrumentality of the lever D, and thus results the unlocking of the door.

In order to provide for closing and locking the door of the safe or vault for two or more days at a time, the dial may be divided into twenty-four, forty-eight, or more hour divisions, and the time-movement may be geared accordingly.

Having now particularly described the construction and operation of my time-lock, what I claim as my invention, and desire to secure by Letters Patent, is—

1. In a time-lock, the combination, with the time mechanism, of an annular disk, to be rotated by the time mechanism, in conjunction with the dial-arbor, at the proper time for unlocking, and a pivoted oscillating hook or catch for holding the locking mechanism in the locked position, which catch is unhooked or released for unlocking when oscillated by the rotation of the annular disk, substantially as described.

2. In a time-lock, the combination of a pivoted oscillating hook or catch, a pivoted lifting or setting arm or lever, to be set by hand in the act of locking, and a spring for holding these two parts in engagement until released by the action of the time mechanism, substantially as described.

3. In a time-lock, the combination of a pivoted oscillating hook or catch and a spring for restoring the catch to its position for re-engagement with the lifting arm or lever after unlocking, substantially as described.

4. In a time-lock, the combination of an annular disk, to be rotated by the time mechanism, in conjunction with the dial-arbor, at the proper time for unlocking, a pivoted oscillating hook or catch normally held in position for locking by a spring, and a pivoted setting arm or lever, to be lifted by hand for engagement with the hook or catch, by which lifting and engagement the time-lock is set into the condition for locking previous to shutting the door, so as to be locked by the act of shutting the door, substantially as described.

In testimony whereof I have hereunto subscribed my name.

CORYDON F. ATWOOD.

Witnesses:
J. J. MOORE,
J. W. JEFFERS.